Oct. 15, 1940.                A. M. LEWIS ET AL                2,218,263
                              WIENERWURST COOKER
                              Filed Jan. 27, 1939
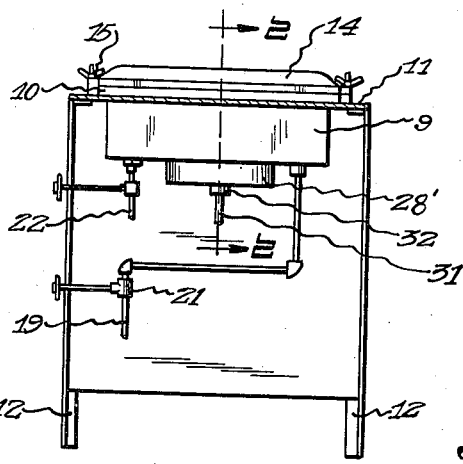
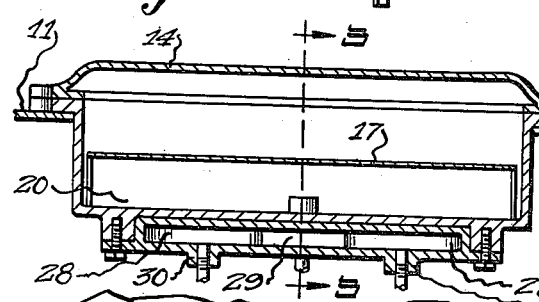
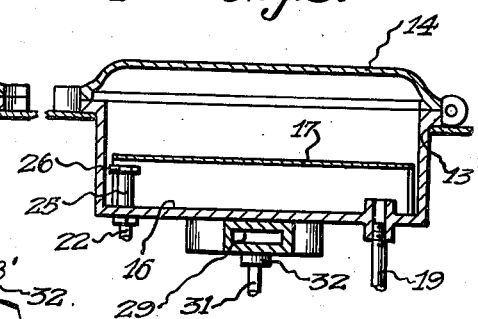
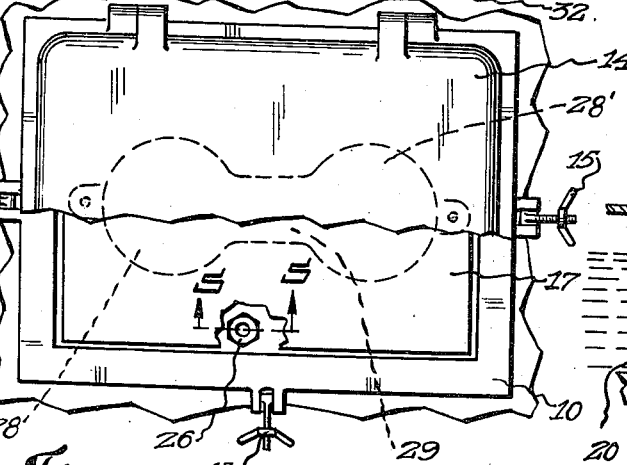
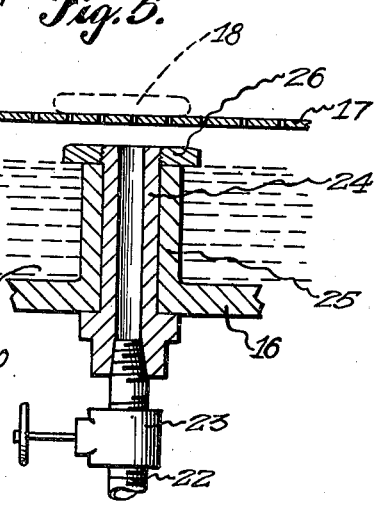
INVENTOR.
ALBERT M. LEWIS
BY PETER B. WEILER
ATTORNEY.

Patented Oct. 15, 1940

2,218,263

UNITED STATES PATENT OFFICE 2,218,263

WIENERWURST COOKER

Albert M. Lewis and Peter B. Weiler, Detroit, Mich.

Application January 27, 1939, Serial No. 253,075

2 Claims. (Cl. 53—2)

Our invention relates to a new and useful improvement in a cooking device, especially adapted for use in cooking frankfurters and the like, although, from the description given, it will be obvious that the invention may be used generally as a steam pressure cooker.

It is an object of the present invention to provide a cooking device of this class which will be simple in structure, economical in manufacture, durable, compact, and highly efficient in use.

It is another object of the present invention to provide a pressure cooker, so arranged and constructed that the article to be cooked may be elevated above any condensate which may form in the cooker.

Another object of the invention is the provision of a cooker of this type, so arranged and constructed that a quantity of hot water may be retained therein for maintaining the cooked food in warm condition.

Other objects will appear hereinafter.

The invention consists in the combination and arrangement of parts hereinafter described and claimed.

The invention will be best understood by a reference to the accompanying drawing, which forms a part of this specification and in which, Fig. 1 is a side elevational view of the invention.

Fig. 2 is a front elevational view of the invention.

Fig. 3 is a sectional view taken on line 3—3 of Fig. 2.

Fig. 4 is a top plan view of the invention with parts broken away.

Fig. 5 is a sectional view taken on line 5—5 of Fig. 4.

As shown in the drawing, the invention comprises a receptacle 9, having at its upper edge an outwardly projecting flange 10. The receptacle is illustrated as supported on a table top 11, mounted on the legs 12. This table top 11 has an opening 13 formed therein through which the receptacle 9 projects, the flange 10 engaging the upper face of the table top 11. A cover 14 is hingedly mounted at one of its edges to the receptacle 12 and suitable keepers 15 are used to secure the cover in closed position and provide steam tight chamber. Mounted in the receptacle 9 in elevated relation to the bottom 16 is a screen 17, upon which may rest the article of food 18 which it is desired to cook. A steam delivery pipe 19 communicates with the interior of the chamber 20, so that steam under pressure may be delivered into the interior of the chamber 20 as desired, upon operation of the valve 21, interposed in the pipe 19. By delivering steam into the interior of the chamber 20, the food therein may be cooked under steam pressure. After the food has been cooked, water may be delivered into the interior of the chamber 20 through the delivery pipe 22 in which is interposed the manually operated valve 23. This pipe 22 communicates with the fitting 24 which projects through the neck 25, extending inwardly from the bottom 16. A nut 26 is threaded on the inner end of the fitting 24 and into engagement with the end of the neck 25, to retain the parts in position. The height of the fitting 24 will determine the water level in the chamber 20. By delivering water into this chamber and maintaining the same heat, the cooked food in the chamber 20 and resting upon the screen 17 above the water level, will be retained in a warm condition.

Mounted on the under surface of the bottom 16 is a housing having a wide end portion 28, connected by constricted portion 29 with a similar wide terminal portion 28'. A steam pipe may be connected to the nipple 30 for delivering steam into the portion 28 of the housing and a drain pipe 31 may be connected to the nipple 32 for conducting condensate from the housing. By maintaining a flow of steam through this housing, the water contained in the compartment may be kept at sufficiently high temperature for satisfactory heating purposes.

It is thus seen that we have provided a durable and simple steam pressure cooker which may be used for cooking purposes and which will also serve the purposes of a warmer.

While we have illustrated and described the preferred form of construction, we do not wish to limit ourselves to the precise details of structure shown, but desire to avail ourselves of such variations and modifications as come within the scope of the appended claims.

What we claim as new and desire to secure by Letters Patent is:

1. In a cooker of the class described: a receptacle; a bottom on said receptacle; a supporting screen in said receptacle, in elevated relation to said bottom; means for conducting water into said receptacle; a drain conduit communicating with said receptacle and terminating at its inner end below said supporting screen, for draining water from said receptacle, upon the rising of the same beyond a pre-determined height; and means for heating water contained in said receptacle.

2. In a cooker of the class described: a receptacle; a bottom on said receptacle; a supporting screen in said receptacle, in elevated relation to said bottom; means for conducting water into said receptacle; a drain conduit communicating with said receptacle and terminating at its inner end below said supporting screen, for draining water from said receptacle, upon the rising of the same beyond a pre-determined height; a housing mounted on the outer surface of the bottom of said receptacle; means of delivering steam to said housing at one end for heating the water in said receptacle; and a drain conduit communicating with the opposite end of said housing for conducting condensate therefrom.

ALBERT M. LEWIS.
PETER B. WEILER.